United States Patent Office 3,758,484
Patented Sept. 11, 1973

3,758,484
3-β-ACETOXY 11-OXO NOROLEANENE-(12) 20β-CARBOXYLIC ACID N-METHYL PIPERIDOL-(4) ESTER
Helmut Kraft, Neckarhausen, Frank Zimmermann, Mannheim, and Hans-Peter Hofmann, Ludwigshafen, Germany, assignors to Knoll AG, Chemische Fabriken, Ludwigshafen (Rhine), Germany
No Drawing. Filed Aug. 25, 1971, Ser. No. 174,924
Claims priority, application Germany, Sept. 2, 1970, P 20 43 479.1
Int. Cl. C07d 29/24
U.S. Cl. 260—293.56    3 Claims

ABSTRACT OF THE DISCLOSURE

3-β-acetoxy 11-oxo noroleanene-(12) 20β-carboxylic acid N-methyl piperidol-(4) ester and physiologically tolerable acid addition salts thereof that are orally administerable and have superior inflammation inhibiting effects are prepared by reacting 3β-acetoxy 11-oxo noroleanene-(12) 20β-carboxylic acid or a functional derivative thereof with N-methyl piperidol-(4).

The present invention relates to a derivative of glycyrrhetinic acid, a process for the preparation thereof and a pharmaceutical composition containing such a derivative.

It is known from the work of R. S. H. Finney and G. F. Somers [J. Pharm. Pharmacol. 10, 613 (1958)] that glycyrrhetinic acid (3β - hydroxy - 11 - oxo-noroleanene-(12)-20β-carboxylic acid) has inflammation inhibiting properties. The introduction of an acetyl group into the 3-position of glycyrrhetinic acid does not change the strength of the inflammation inhibiting effect.

It has now been discovered that a certain ester of 3β-acetoxy glycyrrhetinic acid has superior inflammation-inhibiting properties.

The present invention therefore is concerned with 3β-acetoxy - 11 - oxo-noroleanene-(12)-20β-carboxylic-acid-N-methyl-piperidol-(4)-ester of the formula

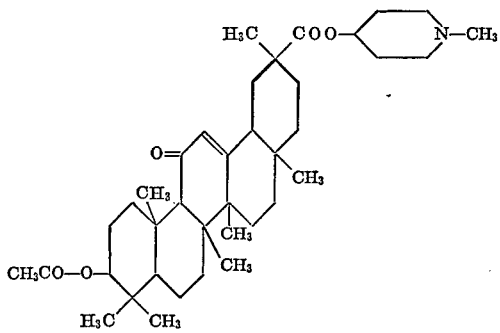

and the salts thereof formed with physiologically compatible acids.

The present invention is also concerned with a method for the preparation of the above compound and its salts wherein 3β-acetoxy 11-oxo noroleanene-(12) 20β-carboxylic acid (or a functional derivative thereof) is reacted with N-methyl piperidol-(4). If desired, the resultant ester may then be converted into the salt of a physiologically compatible acid. The esterification can be performed according to methods known per se. Esterification occurs in high yields if the acid is converted into its chloride and then reacted with N-methyl-piperdol-(4).

The following are among acids considered to be physiologically compatible: hydrochloric acid, sulfuric acid, phosphoric acid, lactic acid, tartaric acid, fumaric acid, citric acid and sulfamic acid.

The Kaolin-Oedema test on rat paws (J. Hillebrecht, Arzneimittelforschung 4, 607 (1954)) indicates that the new compound of this invention and the salts thereof have inflammation-inhibiting properties approximately three times greater than Carbenoxolon (sodium salt). Carbenoxolon is 3β - (3-carboxypropionyloxy)-11-oxo-18β-olean-12-en-30-acid.

In addition, the new compound and its salts lead to a reduction of the ulcer count (O. Munchow, Arzneimittelforschung 4, 341 (1954)) and of the acid secretion in rats whose Pylorus was ligated. (H. Shay, S. A. Komaroy, S. S. Fels, D. Meranze, M. Gruenstein and H. Siplet, Gastroenterology 5, 43 (1945)). With regard to the ulcer protective effect, the new compound and its salts are approximately ten times stronger than Carbenoxolon (sodium salt). In the Lung-Oedema test (according to D. Henschler, W. Ross, Naunyn. Schmiedebergs Arch. exp. Path. Pharmakol. 241, 159 (1961)) the new substances show themselves to be approximately twice as strong as the Carbenoxolon (sodium salt).

Furthermore, the new substances are eight to ten times more compatible than the sodium salt of Carbenoxolon, as shown by the determination of the acute toxicity in the Albino mouse (NMRI) after a single oral dose according to D. J. Finney (Probit Analysis 1962).

The new compound and the salts thereof are therefore well suited for the treatment of disturbances of the alimentary canal, for example, such as gastric or duodenal ulcers. The new active substances are effective when taken orally in doses of approximately 1–10 mg./kg. per day.

EXAMPLE 1

A mixture of 3β-acetoxy-11-oxo-noroleanene-(12)-20β-carboxylic acid chloride (8 g., 0.015 mol), N-methylpiperidol-(4) (3.62 g., 0.032 mol) and toluene (180 ml.) is boiled under reflux for 12 hours. After cooling, N-methylpiperidol-(4)-hydrochloride which has separated out, is filtered off and diethyl ether (180 ml.) is added to the filtrate. By passing HCl gas therethrough, the hydrochloride of 3β-acetoxy - 11 - oxo-noroleanene-(12)-20β-carboxylic-acid-N-methyl-piperidol-(4)-ester is precipitated. A yield of 9.1 g., representing 94% of the theoretical yield is obtained. The compound has an empirical formula of $C_{38}H_{59}NO_5 \cdot HCl$ and a molecular weight of 646.33.

The product is recrystallized from isopropanol and yields colorless crystals having a melting point of 298–300° C., and an $[\alpha]_D^{20}$ of +118.1 (dimethylformamide, c.=0.5).

EXAMPLE 2

A mixture of 3β-acetoxy-11-oxo noroleanene-(12) 20β-carboxylic acid chloride (8 g., 0.015 mol), N-methyl piperidol-(4) (3.62 g., 0.032 mol) and toluene (180 ml.) is boiled under reflux for 12 hours. After cooling, N-methyl piperidol-(4) hydrochloride, which has separated out, is filtered off and the filtrate is evaporated to dryness. The residue is recrystallized twice from a mixture of cyclohexane and n-hexane in a ratio of 1:5. 3β-acetoxy 11-oxo noroleanene-(2) 20β-carboxylic acid N-methyl piperidol-(4) ester is obtained in a yield representing 95% of the theoretical yield. The compound has an empirical formula of $C_{38}H_{59}NO_5$, a molecular weight of 609.9, a melting point of 220–221° C. and an $[\alpha]_D^{20}$ of $+127.1°$ (dimethylformamide, c.=0.5).

By reacting with the corresponding free acids, the following salts may be obtained:

Sulfate $C_{38}H_{59}NO_5 \cdot H_2SO_4$, molecular weight 707.94, having a melting point of 268 to 269° C. when recrystallized from isopropanol $[\alpha]_D^{20} = +107.6°$ (dimethylformamide, c.=0.5)

Sulfamate $C_{38}H_{59}NO_5 \cdot NH_2 \cdot HSO_3$, molecular weight 706.95 having a melting point of 275 to 276° C. when recrystallized from dimethylformamide $[\alpha]_D^{20} = +106.2°$ (dimethylformamide c.=0.5)

Citrate $C_{38}H_{59}NO_5 \cdot C_6H_8O_7$, molecular weight 801.98, having a melting point of 216 to 217° C. when crystallized from isopropanol $[\alpha]_D^{20} = +96.4°$ (dimethylformamide c.=0.5)

EXAMPLE 3

Tablets of the following composition are formed by pressing on a tablet press:

|  | Mg. |
|---|---|
| 3β-acetoxy 11-oxo noroleanene-(12) 20β-carboxylic acid N-methyl piperidol-(4) ester hydrochloride | 50.00 |
| Maize starch | 40.00 |
| Gelatine | 4.50 |
| Lactose | 15.00 |
| Talc | 7.50 |
| Aerosil (Registered Trademark) (chemically pure silicic acid in submicroscopically fine particles | 0.75 |
| Potato starch (as a 6% paste) | 2.25 |

EXAMPLE 4

Sugar coated pills of the following compositions are prepared in the usual manner:

|  | Mg. |
|---|---|
| 3β-acetoxy 11-oxo noroleanene-(12) 20β-carboxylic acid N-methyl piperidol-(4) ester | 35.00 |
| Core material | 85.00 |
| Sweetening | 80.00 |

The core material consists of nine parts maize starch, three parts lactose and one part Luviscol VA 64 (registered trademark) (vinylpyrrolidone-vinyl acetate mixed polymerisate in a 60:40 ratio, Pharm. Ind. 1962, 586). The sweetening consists of five parts cane sugar, two parts maize starch, two parts calcium carbonate and one part talc. The resultant sugar coated pills are then provided with a gastric juice-resistant coating.

We claim:
1. 3β-acetoxy 11-oxo noroleanene-(12) 20β-carboxylic acid N-methyl piperidol-(4) ester.
2. A salt of the compound defined in claim 1 with a physiologically compatible acid.
3. An acid addition salt as defined in claim 2, wherein the acid is selected from the group consisting of sulfuric acid, hydrochloric acid, phosphoric acid, lactic acid, tartaric acid, fumaric acid, citric acid and sulfamic acid.

References Cited

UNITED STATES PATENTS 2,688,021    8/1954    Jenkins _____ 260—294.3

OTHER REFERENCES

Chem. Abstracts 69:44067f (1968) abstract of Japanese Pat. No. 26,300 (1967).

HENRY R. JILES, Primary Examiner

G. T. TODD, Assistant Examiner

U.S. Cl. X.R.

424—267